Feb. 20, 1934.  L. EMANUELI  1,947,929
RESTRICTOR
Filed Sept. 17, 1929
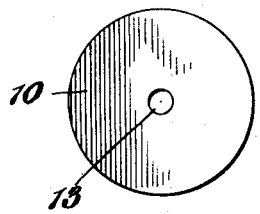
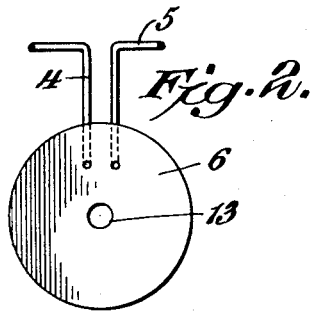
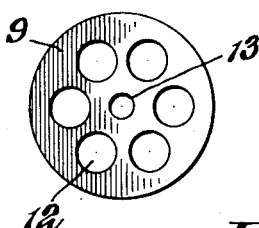
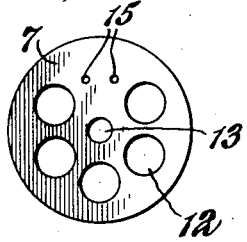
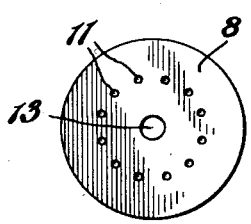
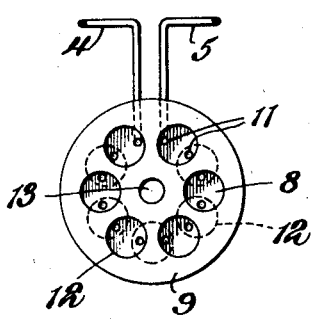
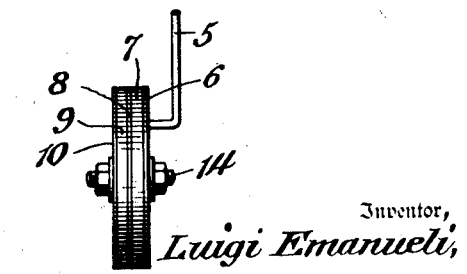
Inventor,
Luigi Emanueli,
By Emil Bönnelycke
Attorney, Patented Feb. 20, 1934

1,947,929

UNITED STATES PATENT OFFICE 1,947,929

RESTRICTOR

Luigi Emanueli, Milan, Italy, assignor to Società Italiana Pirelli, a company of Italy Application September 17, 1929, Serial No. 393,234, and in Great Britain August 17, 1929

4 Claims. (Cl. 137—75)

The present invention refers to electric, oil-filled cable installations and has for its object restrictors for the purpose of limiting the flow of oil from one end of an open length of cable during the operation of laying or repairing the cable or during a leakage in the lead sheath.

It is known that oil-filled cable installations are constituted (1) by cables having internal channels which are constantly fed with oil, (2) by oil-filled hermetically sealed reservoirs connected to the cable at convenient points, near the terminals and joints, which are capable of feeding the cable with oil or of receiving same according to the rise or fall of the temperature, and (3) by stop joints which divide the total length of the cable line into sections, each section being independently fed with oil.

The installation of such cables can be made by laying the adjoining length of cable not yet filled with oil in the ground or ducts, by joining the lengths in a convenient manner, by making vacuum inside the cable and then by filling same with oil. The procedure for making the joints and the impregnation procedure are described in my English Patent No. 276,936.

This procedure, however, necessitates the making of vacuum and the impregnation in the field and is very cumbersome and costly. Another method is therefore preferable, as described in my English Patent No. 304,912, according to which the various lengths of cable are transported to the field already filled with oil at a pressure above atmosphere, each being supplied with a suitable oil reservoir, and are laid and jointed always filled with oil, by suitable methods.

During the jointing operation, however, according to the second procedure, a certain quantity of oil which is supplied by the reservoir flows from the open end of the cable; it is therefore necessary to operate very rapidly and deftly so as not to exhaust the provision of oil from said reservoirs, otherwise air might enter the cable.

The present invention refers specifically to restrictors to be inserted in the tube or conduit through which the oil from the reservoirs flows into the cable, these restrictors having the property of diminishing the flow of oil from said reservoirs. Simple resistances, for example, long and thin tubes, cannot serve as restrictors because the drop of pressure produced by these would simply be proportional to the flow of oil, that is to say, the value of the resistance opposed to the flow of the oil would be constant, i. e., independent of the pressure. As soon as the communication with the outside is established the flow would be abundant and would then rapidly diminish with the drop of pressure in the reservoir. The restrictors, which form the object of this invention, are based instead upon the principle that a hole made in a thin metal plate forms a resistance and determines a drop of pressure proportional to the square of the flow, and therefore it offers a resistance which is proportional to the drop of pressure. In this manner the flow of oil is regulated and varies much less with the drop of pressure in the reservoir.

Besides during the joining of the lengths when a cable is being installed, the restrictors are useful when permanently inserted in the tubes from the reservoirs to the terminals or joints. In fact they reduce to a great extent the loss of oil which may occur when the cable breaks down while working, with a resulting leakage from the lead sheath. Furthermore, they are also necessary when repairs have to be made. In general they are necessary every time there is the need to maintain for a certain time a flow of oil from the open end of a cable, in order to avoid the entrance of air in the cable.

It is necessary, naturally, to design and calculate the dimensions of the restrictors in manner to ensure a flow of a given intensity for a given value of pressure. For instance, the restrictors which are permanently inserted in the feeding tubes of the cable in normal service must give a very small drop of pressure with respect to the pressure in the feeding tank, also when the flow of oil required by the cable or ejected from same is at its maximum value. In this way the restrictor has no sensible influence upon the regular feeding of the cable during normal operation, while it will successfully limit the flow of oil caused by a leakage in the lead sheath, it is so possible to avoid large losses of oil which might rapidly exhaust the quantity of oil in the feeding tanks.

The attached drawing clearly explains the present invention, in which Fig. 1 shows partly in section one means of execution of the present invention; Figs. 2, 3, 4, 5, 6, 7, 8 refer to another means of execution, and specifically Figs. 2, 3, 4, 5, 6 represent separately the component elements of the device; Fig. 7 shows a front view of the device partially assembled, and Fig. 8 shows an edge view of the device completely assembled.

The means of execution of the invention shown in Fig. 1 consists in a series of diaphragms 1, each provided with an orifice or hole 2 of predetermined area, and placed near each other in a tube 3 in such a way that the oil which flows through the tube 3, entering by the tube 4 and going out from the tube 5, or vice versa, is bound to pass through all the orifices or holes 2 of the diaphragms 1 successively as well as through the enlarged cells between the orifices.

The other form of execution consists of five disks 6, 7, 8, 9, 10 shown respectively in Figs. 2, 3, 4, 5, 6, being equal in diameter and placed in mutual side-wise contact in the order indicated. Of these, the central disk 8 (Fig. 4) is thin and has a circular series of small holes 11 placed at equal distances, each of said holes forming a resistance means. The two disks 7 (Fig. 3) and 9 (Fig. 5) which are on either side of the disk 8, are somewhat thicker, and also have a circular series, of a radius equal to the other series, of much larger holes 12, designed to act as so many cells, as has been said above. In contact with the disks 7 and 9 two other disks or end plates 6 (Fig. 2) and 10 (Fig. 6) are placed; these serve to enclose the whole device. The plate 10 is plain as is also the plate 6 except for the openings to receive the inlet and outlet pipes 4 and 5.

In Fig. 8 the disks 6, 7, 8, 9 are seen superposed or assembled with their side faces in firm contact. The disks 7 and 9, which are relatively very thick, are disposed in such manner that the holes of one are facing the intervals between the holes of the other, in other words are in staggered relation. Further, the intervals between the cells or holes 12, in each of the disks 7 and 9, are a good deal smaller (about one-third) than the diameter of the holes themselves. The small holes 11 of the central disk 8 are double the number of the holes 12 in each of the disks 7 and 9, and are placed in such manner that they are in correspondence with the coincident area of the cells or holes 12. With this arrangement, the large holes 12 constitute so many cells successively or serially communicating between themselves by means of the small holes 11 made in the thin disk 8, which acts as a diaphragm between the different cells.

Further, one of the large holes 12 in the disk 7 (Fig. 3) is missing, and in its place the disk 7 is provided with two small holes 15 which lead to the tubes 4 and 5, attached to the disk 6, for the inlet and outlet of the oil.

Each of the five disks have also a central hole 13 through which a bolt 14 is passed, as shown in Fig. 8, which represents the restrictor completely assembled.

Naturally, the diameter of the small holes 11, as also the number of the cells 12, should be such that the complete apparatus reduces the flow of oil to the desired amount.

The second form of execution of the restrictor above described is especially suitable, owing to its small size, to be applied to the reservoirs which are attached to the reels for transporting the lengths of oil-filled cable. They are also suitable to be inserted in the tubes of the feeding tanks of a cable plant, be it near the terminals or near the joints; they can further be used in all those parts of an oil-filled cable plant in which, owing to a leakage of the lead sheath or during repairing operations, it is necessary to reduce the flow of oil, or to render it as independent as possible of the value of the oil pressure. Where the pressures are low the disks may be so tightly clamped that no fluid will leak out between them. I may if desired put a little varnish or other packing material not affected by the oil around the edge to prevent leakage between disks. Where the pressures are relatively high it will be desirable to mount the disks in a suitable enclosing casing, resembling in this particular the casing 3 of Fig. 1 but much shorter.

What I claim as new and desire to secure by Letters Patent of the United States, is,—

1. A restrictor for the flow of oil from an oil-filled cable connected to a feeding means comprising disks assembled flatwise, said disks each containing orifices, those in one disk being relatively large to form cells and those in an adjacent disk being relatively small to form restricted orifices and so disposed that oil flows into and out of each cell through at least two of said orifices.

2. A restrictor for the purpose described comprising a pair of relatively thick disks containing openings which form cells, a relatively thin disk situated between the first named disks and having small orifices, pairs of said orifices opening into single cells, means for closing the end faces of the thick disks, and conduit means for supplying oil to and receiving it from the said orifices.

3. A restrictor for the purpose described comprising a pair of disks arranged side by side, each having a series of openings about its axis which form cells, the cells in one disk being in staggered relation to those in the other disk, a third disk situated between the two and having orifices which register with the cells in such manner as to cause the fluid to flow in succession through the cells, a pair of end plates, a means for clamping the disks between the plates, and conduits for admitting fluid to and receiving it from the device.

4. A restrictor for the purpose described comprising a diaphragm having a plurality of orifices of predetermined area, and a series of cells on opposite sides of the diaphragm, each cell communicating with two other cells located on the opposite side of the diaphragm through two of the said orifices, respectively.

LUIGI EMANUELI.